United States Patent
Sarkar

(10) Patent No.: US 12,229,327 B2
(45) Date of Patent: Feb. 18, 2025

(54) SYSTEM FOR FORENSIC TRACING OF MEMORY DEVICE CONTENT ERASURE AND TAMPERING

(71) Applicant: Micron Technology, Inc., Boise, ID (US)

(72) Inventor: Sourin Sarkar, Karnataka (IN)

(73) Assignee: Micron Technology, Inc., Boise, ID (US)

( * ) Notice: Subject to any disclaimer, the term of this patent is extended or adjusted under 35 U.S.C. 154(b) by 338 days.

(21) Appl. No.: 17/939,640

(22) Filed: Sep. 7, 2022

(65) Prior Publication Data
US 2024/0078348 A1 Mar. 7, 2024

(51) Int. Cl.
*G06F 21/79* (2013.01)

(52) U.S. Cl.
CPC ...... *G06F 21/79* (2013.01); *G06F 2221/2101* (2013.01)

(58) Field of Classification Search
CPC ... G06F 21/78; G06F 21/79; G06F 2221/2101
See application file for complete search history.

(56) References Cited

U.S. PATENT DOCUMENTS

| | | | | |
|---|---|---|---|---|
| 2004/0123132 A1* | 6/2004 | Montgomery | .......... | G06F 21/79 726/20 |
| 2012/0084573 A1* | 4/2012 | Rudelic | .............. | G06F 12/1466 713/193 |
| 2014/0230079 A1* | 8/2014 | Alam | .................. | G11C 11/1695 726/34 |
| 2021/0049309 A1* | 2/2021 | Su | ........................... | G06F 3/062 |
| 2021/0141744 A1* | 5/2021 | Van Leeuwen | ......... | G06F 21/79 |

* cited by examiner

*Primary Examiner* — Daniel B Potratz
(74) *Attorney, Agent, or Firm* — Greenberg Traurig

(57) ABSTRACT

A system for providing forensic tracing of memory device content erasure and tampering is disclosed. The system uses a special command that enables forensic tracing in a secure memory device. Once the forensic tracing is enabled, firmware of the memory device tracks the data stored on the memory device. The command specifies whether the tracking and tracing is for the entire memory device or for a region of the memory device. The firmware confirms that the forensic tracing is enabled, and a target protection region is defined. Once an authenticated command for an operation to access, modify, or erase data of the memory device is received from a host, the system enables the operation to proceed. The system creates a trace of the operation and the metadata of the target region that is modified within a secure memory region of the memory device that is not addressable by the host device.

20 Claims, 4 Drawing Sheets

SYSTEM FOR FORENSIC TRACING OF MEMORY DEVICE CONTENT ERASURE AND TAMPERING

FIELD OF THE TECHNOLOGY

At least some embodiments disclosed herein relate to memory devices in general, and more particularly, but not limited to, a system for providing forensic tracing of memory device content erasure and tampering.

BACKGROUND

Typically, a computing device or system includes one or more processors and one or more memory devices, such as memory chips or integrated circuits. The memory devices may be utilized to store data that may be accessed, modified, deleted, or replaced. The memory devices may be, for example, non-volatile memory devices that retain data irrespective of whether the memory devices are powered on or off. Such non-volatile memories may include, but are not limited to, read-only memories, solid state drives, and NAND flash memories. Additionally, the memory devices may be volatile memory devices, such as, but not limited to, dynamic or static random-access memories, which retain stored data while powered on, but are susceptible to data loss when powered off. Based on receipt of an input, the one or more processors of the computing device or system may request that a memory device of the computing system retrieve stored data associated with or corresponding to the input. In certain scenarios, the data retrieved from the memory device may include instructions, which may be executed by the one or more processors to perform various operations and may include data that may be utilized as inputs for the various operations. In instances where the one or more processors perform operations based on instructions from the memory device, data resulting from the performance of the operations may be subsequently stored into the memory device for future retrieval.

Memory devices are configured to store various kinds of information, including highly sensitive information. The information itself may be stored in a variety of different formats. For example, the information may include documents, photographs, audio content, video content, binary files, among other types of files. Such information is generally written onto the memory device, read from the memory device, and erased or replaced with identical filenames (e.g., such as during an overwrite operation). Currently, effective mechanisms do not exist to determine if sensitive information stored on a memory device has been tampered with or erased from the memory device. As a result, once evidence stored on a memory device is tampered with, there is often no effective way to conduct a study to determine if the data stored in a memory device has been tampered with, contaminated, partially erased, or otherwise modified to confirm that the data can be relied upon. Based at least on the foregoing, providing functionality to effectively determine whether data has been tampered with, will enhance user experiences with memory devices and enhance confidence regarding the security, integrity, and quality of data stored on memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
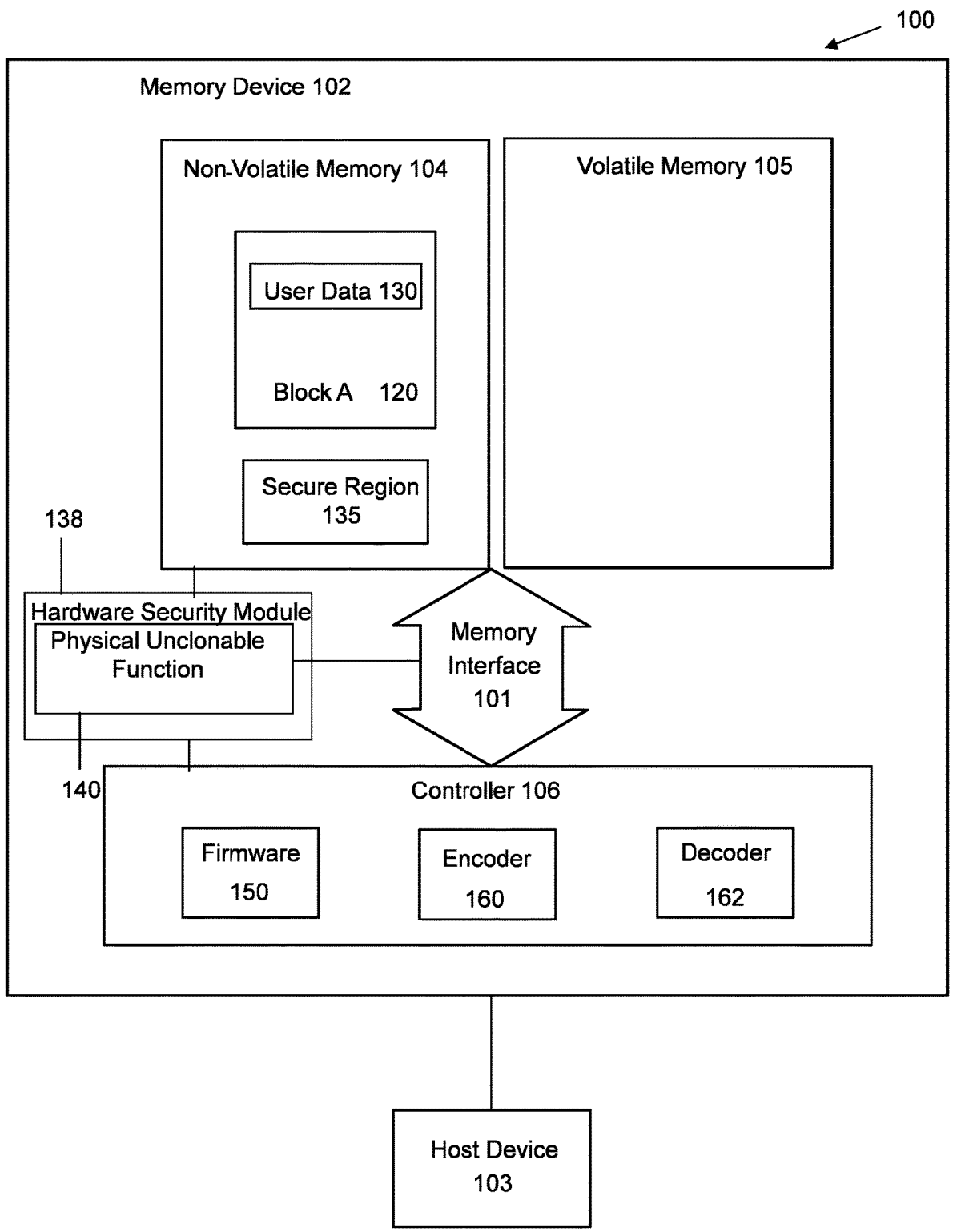
FIG. 1 shows a memory device and host device for forensic trancing of memory device content erasure and tampering in accordance with embodiments of the present disclosure.

The following disclosure describes various embodiments for systems and methods for providing forensic tracing of memory device content erasure and tampering. At least some embodiments of the present disclosure relate to memory device technologies for mitigating the effects and consequences of tampering or unauthorized modification of data stored on memory devices. The systems and methods provide definitive operative functionality to determine if content stored on a secure memory device has been changed, replaced, or erased with malicious intent. Such functionality may be critical when it comes to protecting critical government secrets, dealing with information utilized in court proceedings, securing and tracking private mission critical data, and the like. To that end, in certain embodiments, the systems and methods enable a memory device to generate hidden traces of read, write, delete, or other activities conducted on the memory device that can be retrieved through forensic processes and techniques. Via such forensic processes and techniques, it can be established if information (e.g., content, data, signaling information, or anything storable on a memory device) stored on the memory device was modified, erased, or improperly accessed. In certain embodiments, the system and methods may even be configured to ensure a secure erasure of the memory device where the critical security parameters of the memory device have been zeroized (e.g., low level formatting). In such a scenario, the systems and methods may still trace the activity conducted with respect to the memory device, while simultaneously preventing retrieval of the zeroized content itself. Additionally, the systems and methods disclosed herein provide functionality to effectively trace tampering attempts on the memory device by storing tracking and tracing information associated with the attempts at secure locations of the memory device that are not addressable by a host device. The tracking and tracing information can then be retrieved from the memory device for further analysis and use.

According to embodiments of the present disclosure, the systems and methods involve utilizing a special authenticated command that enables forensic tracking and tracing within a secure memory device. Once the forensic tracking and tracing are enabled via the special authenticated command, firmware of the memory device may be configured to track and trace the data stored on the memory device and any operations conducted with respect to the data stored on the memory device. In certain embodiments, the special authenticated command may be configured to specify whether the tracking and tracing is for the entire memory device or for a specific region or location of the memory device. When the firmware confirms that the forensic tracing is enabled, a target protection region of the memory device may be defined. Once an authenticated command for an operation to access, modify, or erase data of the memory device is received from a host, the system and methods enable the operation to proceed. The systems and methods create a trace of the operation and the metadata of the target region that is modified within a secure memory region of the memory device that is not addressable by the host device.

In certain embodiments, the special authenticated command may be a vendor command that is implemented to enable or disable forensic tracking and tracing of the existing contents and any modification of the contents of a memory device. In certain embodiments, a host device may be configured to transmit the special authenticated command to the memory device. Upon receipt of the special authenticated command, the firmware of the memory device may be configured to initialize a secret portion of the secure memory device (e.g., which may be set aside at the time of manufacturing the memory device) and prepare internal data structures to check for modification or erasure attempts on the existing data stored in the secure memory device. In certain embodiments, the special authenticated command may include bit fields that indicate whether to enable or disable tracking and tracking, and extended security behavior for the monitored data and the region of the memory device.

In certain embodiments, the host device may transmit an additional authenticated command to conduct an operation on a memory of the memory device. For example, the additional authenticated command may be to conduct an operation to modify the data stored in a particular region of the memory device's non-volatile memory. In certain embodiments, when the memory device receives the additional authenticated command, the firmware of the memory device may be configured to analyze the command and determine if the operation associated with the command is to overwrite data at a location in the memory that already has data stored therein or if the request is to erase the data at the location. If forensic tracking and tracing is enabled, the memory device, such as by utilizing the firmware, may generate a record including tracking and tracing information of the operation in a secret portion of the secure memory device that was initialized. In certain embodiments, the tracking and tracing information may be encrypted using cryptographic keys (e.g., such as by utilizing a PUF and hardware security module, which are discussed below), which are not visible outside the memory device (e.g., such as by the host). In certain embodiments, erasure of the secret portion of the secure memory device may be configured to never be erased, even if a full memory device erasure is requested, such as by the host device.

In certain embodiments, the internal firmware logic of the memory device may be configured to only allow authenticated commands to make modifications or erasures to the data stored in a location of the memory device. In certain embodiments, the systems and methods may also be configured to preserve the tracking and tracing data even when a zeroization event occurs, which may involve erasing data, cryptographic keys, and security parameters of the memory device. For example, if tracking and tracing is enabled and the memory device is to be zeroized, the zeroization operations may be traced and tracked, and information relating thereto may be recorded in the secret portion of the memory device. The rest of the zeroization operation may be allowed, such as per product specifications and FIPS compliance, however, the tracking and tracing information may remain in the secret portion of the memory device for further analysis and use. For example, in a zeroized memory device, the tracking and tracing data may be retrieved from the secure memory device by utilizing an authenticated and signed command from a host user, however, it may not be possible to retrieve the tracking and tracing data by the OEM user of the memory device. In such a scenario, the memory device may need to be sent back to the manufacturer of the memory device to conduct special retrieval techniques and processes to extract the tracking in tracing information. In certain embodiments, for a non-zeroized memory device, the tracking and tracing information may be retrieved from the secure portion of the memory device via an authenticated and signed command from the host device.

In certain embodiments, the systems and methods may also implement context awareness of the data in the memory device. For example, in certain embodiments, bits may be implemented in the authenticated commands issued by the host to the memory device to allow the host to send information to the memory device identifying the type of data (e.g., such as via a content identifier) that is to be written onto a specific location on the memory device, among other desired information associated with the operation. In certain embodiments, when the memory device firmware receives an authenticated command from a host device including such bits including the content identifier, the firmware may utilize the content identifier to determine if incoming data (e.g. such as from the host) is information, video data, photo data, text data, document data, zip data, encrypted bit stream data, any type of data, or a combination thereof. The firmware may update its internal data structure (s) and maintain a mapping table that will contain information relating thereto. For example, the mapping table may include information including, but not limited to, an address range (e.g., range of addresses in the memory that data is stored, being modified, or being erased via the commands issued by the host device), an identification of the type of data, a length of the data (e.g., to be written to the memory location), whether forensic tracking and tracing is enabled for the memory device, any other information, or a combination thereof. The context relating to the data and operation to be conducted on the data may allow the forensic tracking and tracing logic of the memory device to accurately capture, in the tracking and tracing information, which type of data was modified or erased by a command from the host. Additionally, the context awareness provides a further benefit of allowing an analyst to have more meaningful traces for evaluation.

The system and methods may incorporate still further features and functionality. For example, when the forensic tracking and tracing is enabled for the memory device, bit fields in the commands may be reserved to implement additional functionality. In certain embodiments, bit fit fields in commands may be utilized to implement a rejection feature. For example, when a modification or erasure attempt (e.g., by a host device) is detected by the firmware of the memory device on the monitored data stored on the memory device and region in which the data is stored, internal logic of the memory device may be configured to reject the authenticated command from the host device associated with the attempt with a return code. The return code may be utilized to request additional authentication information from the host device to proceed with the modification or erasure. In certain embodiments, the host device may then have to send another special authenticated and signed command to allow for modification or erasure on a monitored region of the memory device. Once the host device is verified for conducting the modification or erasure, the firmware may remove a lock on the monitored region of the memory device. Then, the modification or erasure requested by the host device may be performed on the data in the monitored memory region. Tracking and tracing information associated with the modification or erasure may be generated and stored in the secret portion of the memory device, and then the memory device may be configured to lock back on the monitored memory region upon completion of the operation (e.g., the modification or erasure of the data stored in the monitoring memory region).

In certain embodiments, when a modification or erasure attempt by a host device is detected on the monitored data, monitored memory region, or a combination thereof, the memory device may be configured to lock up and prevent any type of operations on the entire memory device (e.g., write operation, modification operation, access operation, erasure operation, etc.). In certain embodiments, the memory device may be configured to lock up only a specific memory region for which forensic tracing and tracking is enabled. In certain embodiments, the enable operations on the memory device going forward, the memory device may need to send the memory device to the original equipment manufacturer or to the manufacturer of the memory device to unlock the memory device so that operations requested by host devices may be conducted after the locking up occurs. Based on at least the foregoing, the functionality provided by the embodiments of the present disclosure provide significant enhancement to memory device technologies including providing a system and accompanying methods for providing forensic tracing and tracking of memory device content erasure and tampering.

Referring now also to FIG. 1, FIG. 1 illustrates an exemplary architecture for a memory device 102 and host device 103 that may be utilized to support forensic tracking and tracing of memory device content erasure and tampering in accordance with embodiments of the present disclosure. The memory device 102 and other componentry illustrated in the Figures may belong to a system 100. In certain embodiments, the memory device 102 is, for example, but not limited to, an SSD, eMMC, memory card, or other storage device, or a NAND-based flash memory chip or module that is capable of encoding and decoding stored data, such as by utilizing an encoder 160 and decoder 162 of the memory device 102. In certain embodiments, the memory device 102 may include any amount of componentry to facilitate the operation of the memory device 102. In certain embodiments, for example, the memory device 102 may include, but is not limited to including, a non-volatile memory 104, which may include any number of memory blocks, such as memory block 120 (e.g., Block A), a volatile memory 105, a memory interface 101, a controller 106 (which may include the encoder 160 and a decoder 162), a hardware security module 138, any other componentry, or a combination thereof. The memory device 102 may communicatively link with a host device 103, which may be or include a computer, server, processor, autonomous vehicle, any other computing device or system, or a combination thereof.

In certain embodiments, the non-volatile memory 104 may be configured to retain stored data irrespective of whether there is power delivered to the non-volatile memory 104. In certain embodiments, the non-volatile memory 104 may be configured to include any number of memory blocks 120 that may be configured to stored user data 130. In certain embodiments, the non-volatile memory 104 may be configured to include a secure memory region 135, which may be configured by the manufacturer of the memory device 102 prior to shipment to a customer that may incorporate the memory device 102 into a printed circuit board, into another device (e.g., autonomous vehicle or computer), onto another device (e.g. a computer chip), or a combination thereof. In certain embodiments, the secure memory region 135 may be configured to store forensic tracking and tracing information, such as when a forensic tracking and tracing mode is enabled for the memory device (e.g., such as via an authenticated command issued by a host device 103). In certain embodiments, the forensic tracking and tracing data may include, but is not limited to, an identification of the data stored on the memory device 102, information describing how and when the data was modified, erased, accessed, or a combination thereof, information indicating whether a hacker accessed a particular memory region of the memory device, an address of a memory region for which data stored thereon was modified, erased, or accessed, data length information for the data in the monitored memory region, information indicating a type of data in the monitored region, information indicating metadata describing the data stored in the monitored memory region, an identification of specific information within the data that was modified or erased, any other information associated with the data, any other information associated with the monitored memory region, information identifying the host, information identifying the command issued by a host to modify, access, or erase the data within the monitored memory region, or a combination thereof. In certain embodiments, the secure memory region 135 may be configured to not be addressable by the host device 103 so that the host device 103 cannot access the tracking and tracing data stored therein. In certain embodiments, the secure memory region 135 may be configured to be accessed by the host device 103 based on authenticated commands that have been verified by the memory device 102. In certain embodiments, the secure memory region 135 may be configured to only be accessed by the manufacturer of the memory device 102, an original equipment manufacturer incorporating the memory device 102 into another device, or a combination thereof.

In certain embodiments, the controller 106 of the memory device 102 may be configured to control access to the non-volatile memory 104, the volatile memory 105, or a combination thereof. In certain embodiments, user data 130 is provided by controller 106 to non-volatile memory 104, such as by utilizing memory interface 101. For example, the user data may be obtained from the host device 103 to be stored in the non-volatile memory 104, such as in memory block 120. In certain embodiments, the controller 106 may include an encoder 160 for generating ECC data (e.g., such as when writing data to the non-volatile memory 104), and decoder 162 for decoding ECC data (e.g., when reading data, such as from the non-volatile memory 104). In certain embodiments, the controller 106 may include firmware 150, which may be configured to control the components of the system 100. In certain embodiments, the firmware 150 may be configured to control access to the non-volatile memory 104 by the host device 103 and control the operative functionality of the memory device 102. Further details relating to the firmware 150 are discussed below.

As indicated above, the memory device 102 may be configured to receive data (e.g., user data) to be stored from host device 103 (e.g., over a serial communications interface, or a wireless communications interface). In certain embodiments, the user data 130 may be video data from a device of a user, sensor data from one or more sensors of an autonomous or other vehicle, text data, audio data, virtual reality data, augmented reality data, information, content, any type of data, or a combination thereof. In certain embodiments, memory device 102 may be configured to store the received data in memory cells (not explicitly shown) of non-volatile memory 104. In one example, the memory cells may be provided by one or more non-volatile memory chips. In one example, the memory chips may be NAND-based flash memory chips, however, any type of memory chips or combination of memory ships may also be utilized. In certain embodiments, the memory device 102 may be configured to store received data in volatile memory 105 on a non-persistent basis.

In certain embodiments, the memory device 102 may include any number of hardware security modules (HSMs) 138. In certain embodiments, the HSM 138 may include an interface that facilitates communications to and from the host device 103. In certain embodiments, the interface can comprise a Peripheral Component Interconnect Express (PCIe) interface or other interface. In certain embodiments, the interface can comprise other similar types of interfaces such as a Non-Volatile Memory Express (NVMe), NVMe over Fiber (NVMeOF), Serial Peripheral Interface (SPI), or similar bus. In certain embodiments, HSM 138 may be configured to receive commands from host device 103, such as via interface 101 or via its own interface. In certain embodiments, the commands can comprise commands that are to be executed in a secure manner. For example, the commands can comprise commands to generate or derive cryptographic keys, read cryptographic keys, encrypt or decrypt data, generate digital signatures, etc. In certain embodiments, any commands currently executable by existing HSMs can be received via interface 101.

In certain embodiments, the HSM 138 may include volatile storage area. In certain embodiments, the volatile storage area can comprise any type of memory that loses data store therein when the memory device 102 is powered off or if power to the volatile storage area falls below a threshold for sustaining the volatile storage area operation. For example, the volatile storage area can comprise a dynamic random-access memory (DRAM), static random-access memory (SRAM), or similar types of volatile storage area technologies. In certain embodiments, the HSM 138 may utilize the volatile storage area to store cryptographic data (e.g., keys, seeds, results, authentication information, identities, etc.). In certain embodiments, since the volatile storage area may lose data when powered off, the HSM 138 may not persistently store sensitive data when powered off. In certain embodiments, the volatile storage area can comprise a register file or may comprise a DRAM or SRAM and one or more registers.

In certain embodiments, HSM 138 may include a physical unclonable or physically unclonable function (PUF) 140. In certain embodiments, the PUF 140 may comprise a physical hardware circuit that exploits inherent randomness introduced during manufacturing to give a physical entity a unique 'fingerprint' or trust anchor. In certain embodiments, the PUF 140 may produce a consistent and repeatable value. In certain embodiments, the PUF 140 may comprise a SRAM PUF, Delay PUF, or any other PUF technology implemented on the HSM 138. In certain embodiments, the HSM 138 may create a PUF 140 from a portion of uninitialized memory space in the volatile storage area that is not subsequently used for any other purpose. Thus, the PUF 140 value may be related to the random value of the portion of the memory space in the volatile storage area. In certain embodiments, by not storing keys, the HSM 138 may not be susceptible to offline attacks. Further, in certain embodiments, security requirements can be relaxed since keys are only stored in volatile storage area and not persistent memory.

In certain embodiments the firmware 150 of the memory device 102 may be configured to control the operative functionality of the memory device 102. In certain embodiments, the firmware 150 may be configured to manage all operations conducted by the controller 106. In certain embodiments, the firmware 150 may be configured to enter a forensic tracking and tracing mode, such as when a transaction initiated (e.g., such as via an authenticated vendor command) by the host device 103 for the memory device 102 is determined by the firmware 150 to include forensic tracking and tracing parameters, a request to enable forensic tracking and tracing, or a combination thereof. In certain embodiments, the firmware 150 may contain logic that is configured to detect a context in which a transaction is initiated by a host device 103. For example, the context may indicate the type of data that is to be modified or erased by a command issued by a host device 103. Based on the detected context, the firmware 150 may be utilized to set certain conditions within its internal data structures and state machines to account for the context. These conditions may be utilized to assist the firmware 150 to become context aware, such as it relates to a memory region for which forensic tracking and tracing is enabled.

Figure 2:
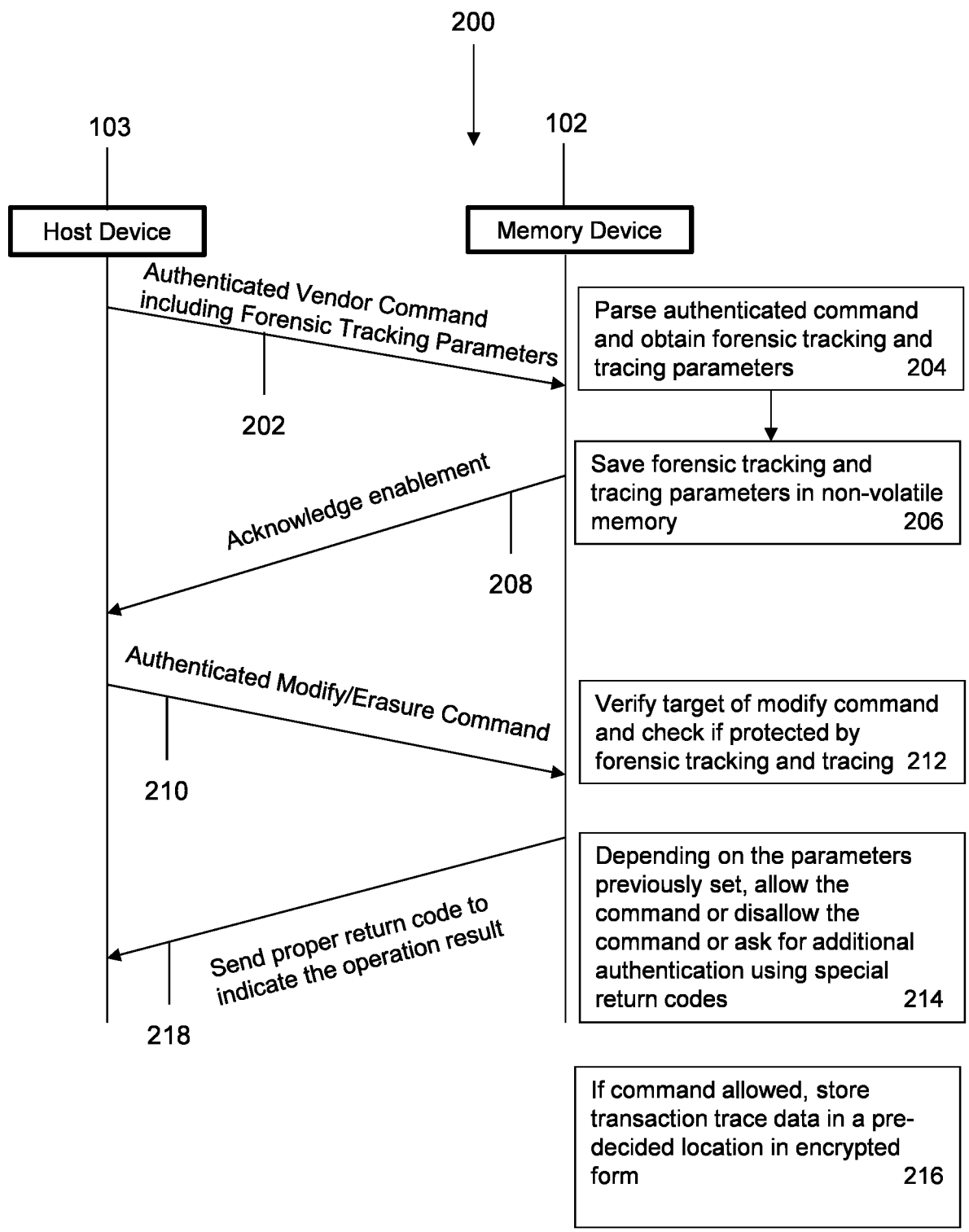
FIG. 2 shows exemplary interactions between a host device and memory device for facilitating forensic tracing of memory device content erasure and tampering in accordance with embodiments of the present disclosure.

Referring now also to FIG. 2, an exemplary flow 200 illustrating interactions between a host device 103 and a memory device 102 in accordance with embodiments of the present disclosure is shown. In certain embodiments, the interactions may be utilized to set up forensic tracing and tracking, authorize commands (i.e., commands to perform transactions including operations to be performed on data stored in the memory device 102, replace data stored in the memory device 102, or perform other actions with respect to the memory device 102), save forensic tracking and tracing parameters, allow or disallow the commands, perform the commands if authorized, and record forensic tracking and tracing data for further analysis and use. The flow 200 is exemplary and only intended to illustrate a specific possible implementation. The steps of the flow 200 may be performed in other desired sequences and supplemented with other functionality as described in the present disclosure. Illustratively, the flow 200 may include, at step 202, having a host device 103 transmit an authenticated vendor command including forensic tracking and tracing parameters to the memory device 102. The forensic tracking and tracing parameters may be stored within bits of the command and may be configured to indicate whether forensic tracking and tracing is to be enabled for the entire memory device 102 (e.g., bit value of 1 means enable forensic tracking and tracing and 0 may indicate to disable forensic tracking and tracing or not to enable forensic tracking and tracing), a memory region of the memory device 102 for which forensic tracking and tracing is to be enabled, the type of data to be tracked and traced, the type of information to track and trace associated with the data stored on the memory device 102 (e.g., information identifying the data, information identifying the type of data, information identifying whether the data was modified, information identifying how the data was modified, information identifying the data that replaced existing data stored in the memory device 102, information identifying data that was not modified, information identifying data erased from the memory device 102, information describing the data, any other information, or a combination thereof), a host identifier, a timestamp associated with the command, any other parameters, or a combination thereof. In certain embodiments, the tracking and tracing parameters may be set by the manufacturer, the vendor (e.g., customer that purchased the memory device 102 for incorporation into another device), or a combination thereof.

At step 204, the memory device 102, such as via the firmware 150 of the memory device 102, may be configured to parse the authenticated command and obtain the tracking and tracing parameters from the command. At step 206, the flow 200 may include having the memory device 102, such as via the firmware 150, save the forensic tracking and tracing parameters in the memory device 102. In certain embodiments, the memory device 102 may save an indication of the type of security behavior that the memory device 102 is to exhibit with respect to the tracked and traced data, the tracked and tracked memory region, or a combination thereof. In certain embodiments, the parameters and the requested security behavior in the non-volatile memory 104, the volatile memory 105, or a combination thereof, depending on the context associated with the forensic tracking and tracing, the type of operation to be conducted with respect to the memory device 102, any other context, or a combination thereof. At step 208, the flow 200 may include having the memory device 102 issue an acknowledgement return code to the host device 102. In certain embodiments, the acknowledgment may be utilized to prompt the host device 102 to issue a command to perform an action with respect to the memory device 102. For example, at step 208, the flow 200 may include the host device 103 transmitting or issuing an authenticated command to perform a transaction for which operations are to be conducted on the memory device 102, such as modifying or erasing data stored thereon. In certain embodiments, tracking and tracing data may be included with the authenticated command or within the command itself, such as via bits of the command.

At step 212, the flow 200 may include verifying, at the memory device 102, the target memory region of the authenticated command and determine if the memory region targeted by the command is protected based on enablement of forensic tracking and tracing. At step 214, the flow 200 may include allowing or disallowing the command based on the tracing and tracking parameters previously saved and set for the memory device 102. In certain embodiments, the memory device 102 may allow the operations associated with the command issued by the host device 102, however, in certain embodiments, the memory device 102 may request additional authentication from the host device 103 via a further return code, which if provided, may then enable the operations associated with the command to be conducted on the memory device 102. At step 216, the flow 200 may include storing transaction trace data in a pre-decided memory location of the memory device 102 in encrypted form (e.g., encrypted using the PUF 140 and hardware security module 138), which may be associated with the operations conducted that are associated with the command. For example, the tracking and tracing data may be stored in the secure memory region 135 of the non-volatile memory 104. At step 218, the method 200 may include responding to the host device 103 when the operations associated with the command are completed. The response may include a return code indicating the result(s) of the operations conducted on the target region of the memory device 102.

Figure 3:
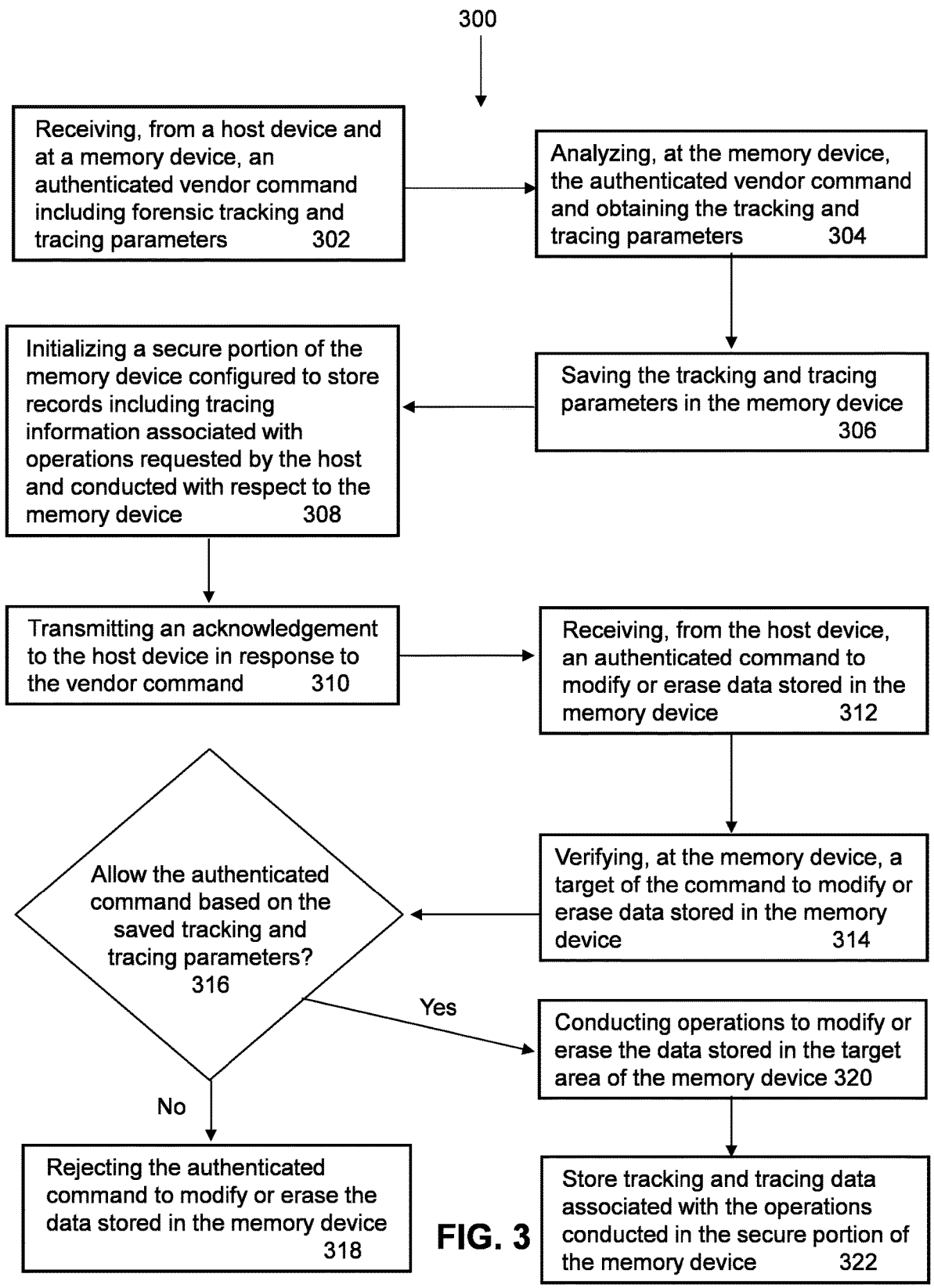
FIG. 3 illustrates a method for providing forensic tracing of memory device content erasure and tampering in accordance with embodiments of the present disclosure.

Referring now also to FIG. 3, FIG. 3 illustrates a method 300 for providing forensic tracing and tracking of memory device content erasure and tampering according to embodiments of the present disclosure. For example, the method of FIG. 3 can be implemented in the system 100 of FIG. 1 and any of the other systems or devices illustrated in the Figures. In certain embodiments, the method of FIG. 3 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method of FIG. 3 may be performed at least in part by one or more processing devices (e.g., controller 106 of FIG. 1). Although shown in a particular sequence or order, unless otherwise specified, the order of the processes may be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

The method 300 may include steps for providing forensic tracing and tracking of memory device content erasure and tampering according to various embodiments of the present disclosure. In certain embodiments, the method 300 may be performed by utilizing the system 100, by utilizing any combination of the componentry contained therein, or a combination thereof. At step 302, the method 300 may include receiving a command from a host device (e.g., host device 103) at a memory device (e.g., memory device 102). The command, for example, may be associated with setting up forensic tracking and tracing for the memory device 102 or a particular target region of the memory device 102 (or the entire memory device 102). At step 304, the method 300 may include analyzing (or parsing), at the memory device 102, the command (e.g., an authenticated vendor command authenticated utilizing the PUF 140 and hardware security module 138). Based on the analyzing, the tracking and tracing parameters specified in the command (e.g., such as via bits of the command) may be saved in the memory device 102, at step 306. At step 308, the method 300 may include initializing a secure portion of the memory device 102 (e.g., secure portion 135) configured to store records including tracking and tracing information associated with operations requested by the host device 103 and conducted with respect to the memory device 102, such as on a target memory region of the memory device 102. The initializing may be initiated based on the tracking and tracing parameters indicating that forensic tracking and tracing is to be enabled.

At step 310, the method 300 may include transmitting, by the memory device 102, an acknowledgement to the host device 103 in response to the command issued by the host device 103. In certain embodiments, the acknowledgement may be in the form of a return code issued by the memory device 102. At step 312, the method 300 may include receiving from the host device 103, an authenticated command to conduct a transaction on the memory device 102, which may require performance of various operation to support the transaction. In certain embodiments, for example, the transaction associated with the command may include, but is not limited to, a read transaction, a write transaction, a memory access transaction, an erase transaction, a secure read transaction, a secure write transaction, a secure erase transaction, a transaction to modify a security parameter of the memory device, a request response secure transaction, an atomic secure transaction, any other type of transaction, or a combination thereof. In certain embodiments, the command may be received by the memory device 102, such as by a controller (e.g., controller 106) of the memory device 102. As an example, the command may be to conduct a transaction involving securely writing, erasing, or replacing data to a target location of the memory device 102.

At step 314, the method 300 may include verifying, at the memory device 102, the target of the command and to determine if the target is protected via forensic tracking and tracing. At step 316, the method 300 may include determining if the authenticated command should be allowed or disallowed based on the saved tracking and tracing parameters. If the command is to be disallowed, the method 300 may include rejecting the authenticated command to modify, erase, access, or otherwise conduct operations on the target region of the memory device 102. If, however, the command is to be allowed at step 316, the method 300 may proceed to step 320. At step 320, the method 300 may include conducting the operations associated with the transaction associated with the command. At step 322, the method 300 may include storing tracking and tracing data associated with the conducted operations in the secure portion 135 of the memory device. The tracking and tracing data stored in the secure portion 135 may be accessed by an authorized host or other device to conduct further analysis and gain insight onto potential tampering of the data stored on the memory device 102. In certain embodiments, at step 316, the method 300 may include requesting additional authentication information from the host device 102 to determine whether to reject or allow the command. In certain embodiments, at step 322, the tracking and tracing data may be encrypted by the memory device 102 (such as by utilizing the PUF 140 and hardware security module 138) before storing the data into the secure memory region 135. In certain embodiments, the secure region 135 may not be addressable by the host device 103 and may be configured to be hidden or secret. The method 300 may repeated as necessary as new commands and transactions are initiated by the host device 103 to the memory device 102. Notably, the method 300 may incorporate any of the other functionality as described herein and may be adapted to support the functionality of the system 100 or as otherwise described herein. For example, the method 300 may be configured to incorporate the rejection and memory device locking up features described herein. As another example, the method 300 may be configured to incorporate the context awareness features of the invention. In certain embodiments, the commands may enable the host device 103 to send information to the memory device 102 that identify the type of data being written to the target memory region of the memory device 102, which the firmware 150 may utilize to determine the type of data and to update internal data structures to facilitate maintenance of a mapping table as described herein. The method 300 may also be configured to incorporate the zeroization functionality described herein and the retrieval of tracking and tracing data described herein. In certain embodiments, the method 300 and system 100 may be utilized to enable a user or device to perform a forensic tracing of data modification attempts in a secure memory device, such as memory device 102. In certain embodiments, the method 300 and system 100 may provide additional security within the memory device 102 without relying on any external tracing outside of the memory device 102.

Figure 4:
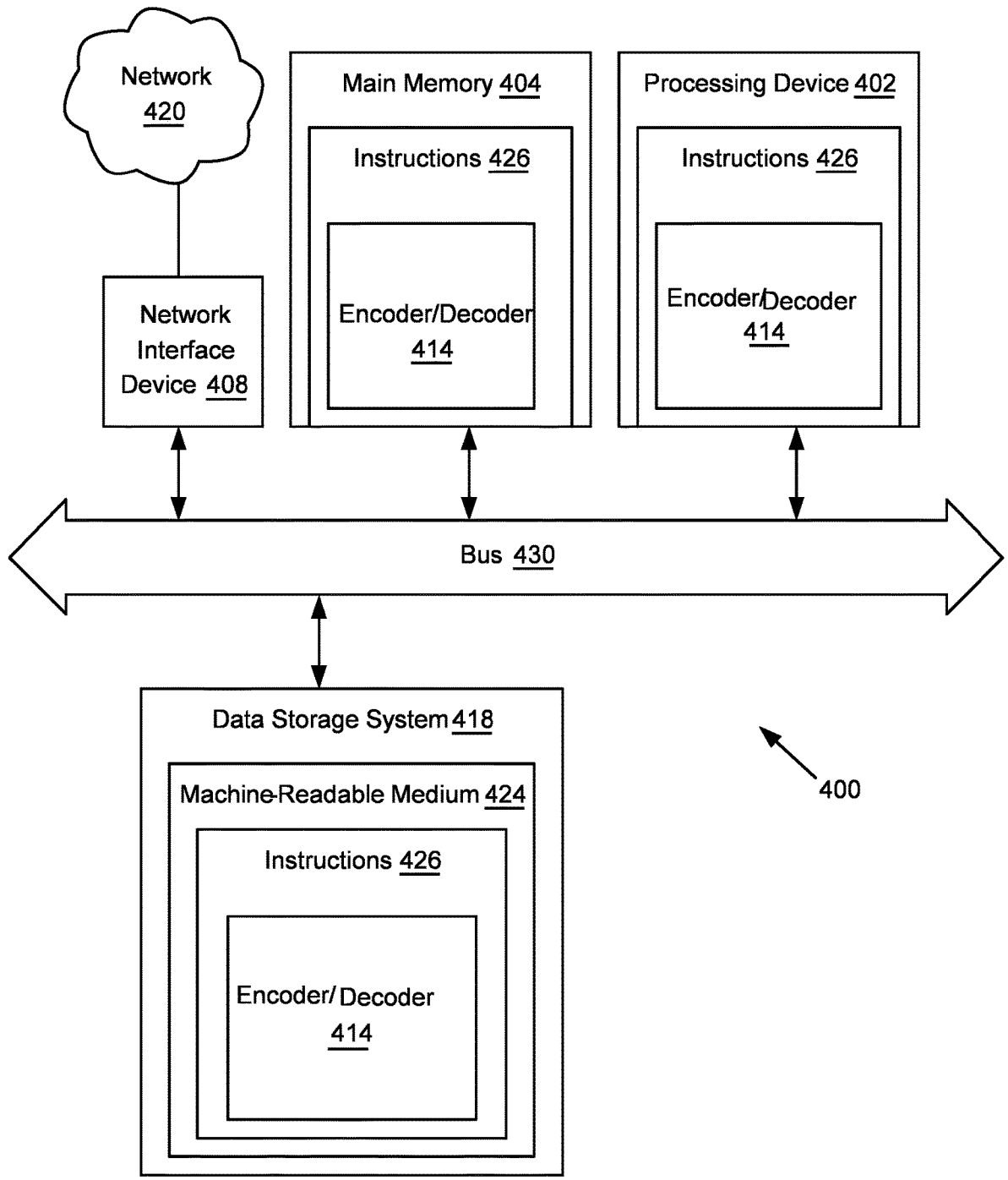
FIG. 4 illustrates a schematic diagram of a machine in the form of a computer system within which a set of instructions, when executed, may cause the machine to facilitate functionality supporting forensic tracing of memory device content erasure and tampering according to embodiments of the present disclosure.

FIG. 4 illustrates an exemplary machine of a computer system 400 within which a set of instructions, for causing the machine to perform any one or more of the methodologies discussed herein, can be executed. In certain embodiments, the computer system 400 can correspond to a host system or device (e.g., the host device 103 of FIG. 1) that includes, is coupled to, or utilizes a memory system (e.g., the memory device 102 of FIG. 1). In certain embodiments, computer system 400 corresponds to memory device 102, host device 103, or a combination thereof. In certain embodiments, the machine may be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment. In certain embodiments, the machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

In certain embodiments, the exemplary computer system 400 may include a processing device 402, a main memory 404 (e.g., read-only memory (ROM), flash memory, dynamic random-access memory (DRAM) such as synchronous DRAM (SDRAM) or Rambus DRAM (RDRAM), static random-access memory (SRAM), etc.), and/or a data storage system 418, which are configured to communicate with each other via a bus 430 (which can include multiple buses). In certain embodiments, processing device 402 may represent one or more general-purpose processing devices such as a microprocessor, a central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets, or processors implementing a combination of instruction sets. In certain embodiments, the processing device 402 may also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. For example, the processing device 402 may be configured to perform steps of flow 200 and the method 300 and support functionality provided by the system 100. For example, in certain embodiments, the computer system 400 may be configured assist in parsing authenticated commands, obtaining forensic tracking and tracing parameters, saving forensic tracking and tracing parameters in the memory device 102, transmitting acknowledgements in response to commands, verifying targets of commands, determining whether to allow or disallow a command, transmitting return codes for additional authentication information to a host device (e.g., host device 103), storing transaction tracking and tracing data in a secure region of the memory device 102 that is not addressable by the host device 103, retrieving the stored tracking and tracing data from the secure region of the memory device, performing any other operations as described herein, or a combination thereof. As another example, in certain embodiments, the computer system 400 may assist with conducting the operative functionality of the controller 106. In certain embodiments, computer system 400 may further include a network interface device 408 to communicate over a network 420.

The data storage system 418 can include a machine-readable storage medium 424 (also referred to as a computer-readable medium herein) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory device 102, or a combination thereof.

Reference in this specification to "one embodiment" "an embodiment" or "certain embodiments" may mean that a particular feature, structure, or characteristic described in connection with the embodiment is included in at least one embodiment of the disclosure. The appearances of the phrases "in one embodiment" and "in certain embodiments" in various places in the specification are not necessarily all referring to the same embodiment(s), nor are separate or alternative embodiments mutually exclusive of other embodiments. Moreover, various features are described which may be exhibited by some embodiments and not by others. Similarly, various requirements are described which may be requirements for some embodiments, but not other embodiments.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A system, comprising:
a host device; and
a memory device configured to store data, the memory device comprising:
a controller;
wherein the controller is configured to receive a first authenticated command from the host device, wherein the first command is associated with enabling forensic tracking and tracing in the memory device;
wherein the controller is configured to parse the authenticated command to obtain tracking and tracing parameters associated with the forensic tracking and tracing;
wherein the controller is configured to transmit an acknowledgement to the host device in response to the first authenticated command;
wherein the controller is configured to receive a second authenticated command, wherein the second authenticated command is associated with performing an operation at a target location in a memory of the memory device;
wherein the controller is configured to verify the second authenticated command and the target location;
wherein the controller is configured to conduct the operation at the target location; and
wherein the controller is configured to record tracking and tracing data associated with the operation conducted at the target location in a secure memory tracing location of the memory of the memory device.

2. The system of claim 1, wherein the controller is further configured to initialize the secure memory tracing location of the memory of the memory device in response to receiving the first command and based on the tracking and tracing parameters.

3. The system of claim 1, wherein the controller is further configured to configure an internal data structure of firmware to identify a modification attempt, erasure attempt, or a combination thereof, associated with existing data stored at the target location.

4. The system of claim 1, wherein the controller is further configured to save the tracking and tracing parameters in the memory of the memory device after parsing the authenticated command.

5. The system of claim 1, wherein the operation associated with the second authenticated command comprises a request to access data at the target location, a request to modify data at the target location, a request to erase data at the target location, a request to read data at the target location, a request to write data at the target location, or a combination thereof.

6. The system of claim 5, wherein the controller is configured to allow or disallow the second authenticated command based on the tracking and tracing parameters.

7. The system of claim 1, wherein the controller is configured to transmit, to the host device, a return code indicating a result of the operation conducted at the target location in the memory of the memory device.

8. The system of claim 1, wherein the controller is further configured to encrypt the tracking and tracing data associated with the operation prior to recordation of the tracking and tracing data in the secure memory tracing location of the memory of the memory device.

9. The system of claim 1, wherein the controller is configured to request additional authentication information from the host device via a return code prior to conducting the operation at the target location of the memory of the memory device.

10. The system of claim 1, wherein the controller is configured to facilitate retrieval of the tracking and tracing data stored in the secure memory tracing location based on receipt of a third authenticated command signed by the host device.

11. The system of claim 1, wherein the controller is configured to determine a context associated with the operation to be conducted at the target location, wherein the context is based on a content identifier present in bits of the second authenticated command, wherein the content identifier indicates a type of data being accessed, written, erased, or a combination thereof, at the target location.

12. The system of claim 11, wherein the controller is configured to update an internal data structure based on the content identifier to facilitate maintenance of a mapping table containing information including a memory address range associated with the operation, a type of data associated with the operation, a data length associated with data affected by the operation, an indication of whether forensic tracking and tracing has been enabled, or a combination thereof.

13. The system of claim 12, wherein the controller is configured to capture, in the tracing and tracking data, the type of data associated with the operation.

14. A method, comprising:
   receiving, at a memory device, a first authenticated command from a host device, wherein the first command is associated with enabling forensic tracking and tracing in the memory device;
   parsing the authenticated command to obtain tracking and tracing parameters associated with the forensic tracking and tracing;
   transmitting an acknowledgement to the host device in response to the first authenticated command;
   receiving, at the memory device, a second authenticated command, wherein the second authenticated command is associated with performing an operation at a target location in a memory of the memory device;
   verifying, at the memory device, the second authenticated command and the target location;
   conducting the operation at the target location; and
   recording tracking and tracing data associated with the operation conducted at the target location in a secure memory tracing location of the memory of the memory device.

15. The method of claim 14, further comprising rejecting the second authenticated command with a return code transmitted to the host device, wherein the return code requests additional authentication information from the host device.

16. The method of claim 15, further comprising receiving, at the memory device, a third authenticated command to allow for the operation to be conducted at the target location, wherein the third authenticated command includes the additional authentication information.

17. The method of claim 16, further comprising unlocking, after receiving the third authenticated command, the target location in order to conduct the operation at the target location.

18. The method of claim 17, further comprising locking the target location upon completion of the operation at the target location.

19. The method of claim 14, further comprising receiving a third authenticated command from the host device to disable the forensic tracking and tracing in the memory device.

20. A memory device, comprising:
   a controller comprising firmware for controlling operations of the memory device;
      wherein the controller is configured to receive a first authenticated command from the host device, wherein the first command is associated with enabling forensic tracking and tracing in the memory device;
      wherein the controller is configured to obtain, from the first authenticated command, tracking and tracing parameters associated with the forensic tracking and tracing;
      wherein the controller is configured to receive a second authenticated command, wherein the second authenticated command is associated with performing an operation at a target location in a memory of the memory device;
      wherein the controller is configured to conduct the operation at the target location after verification of the second authenticated command; and
      wherein the controller is configured to record tracking and tracing data associated with the operation conducted at the target location in a secure memory tracing location of the memory of the memory device.

* * * * *